US010884865B2

(12) United States Patent
Giovannini et al.

(10) Patent No.: US 10,884,865 B2
(45) Date of Patent: Jan. 5, 2021

(54) IDENTIFYING REDUNDANT NODES IN A KNOWLEDGE GRAPH DATA STRUCTURE

(71) Applicant: INTERNATIONAL BUSINESS MACHINES CORPORATION, Armonk, NY (US)

(72) Inventors: Andrea Giovannini, Zurich (CH); Tim U. Scheideler, Schoenenberg (CH); Erik Rueger, Ockenheim (DE); Thomas Snellgrove, Wakefield, MA (US); Stefan Ravizza, Wallisellen (CH); Florian Graf, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 15/880,640

(22) Filed: Jan. 26, 2018

(65) Prior Publication Data

US 2019/0235961 A1 Aug. 1, 2019

(51) Int. Cl.
*G06F 11/14* (2006.01)
*G06F 16/951* (2019.01)

(52) U.S. Cl.
CPC ...... *G06F 11/1448* (2013.01); *G06F 11/1464* (2013.01); *G06F 16/951* (2019.01)

(58) Field of Classification Search
None
See application file for complete search history.

(56) References Cited

U.S. PATENT DOCUMENTS

| 9,262,308 B2* | 2/2016 | Dwarakanath ...... G06F 11/3684 |
| 2006/0277032 A1* | 12/2006 | Hernandez-Abrego ..... G10L 15/193 704/9 |
| 2011/0131211 A1* | 6/2011 | Harrington ......... G06F 16/3323 707/741 |

(Continued)

FOREIGN PATENT DOCUMENTS

| CN | 1040359917 A | 9/2014 |
| CN | 105574098 A | 5/2016 |

OTHER PUBLICATIONS

Wei et al., "KGRL: An OWL2 RL Reasoning System for Large Scale Knowledge Graph", 2016 12th International Conference on Semantics, Knowledge and Grids, pp. 83-89.

(Continued)

*Primary Examiner* — Kim T Nguyen
(74) *Attorney, Agent, or Firm* — John Noh

(57) ABSTRACT

A method, computer system, and computer program product for eliminating a redundant node from a knowledge graph is provided. A structural analysis of a knowledge graph is performed by determining that two nodes have a similar structure. An empirical analysis is performed by determining a search result correlation of potentially redundant nodes, said search result correlation comprising a correlation of search result nodes generated from different search queries to said knowledge graph or a correlation of search results due to selected search result nodes in subtrees of said potentially redundant nodes. Results of said structural analysis and said empirical analysis are combined to generate a (Continued)

redundancy confidence level value for two said nodes. One of said two nodes is determined as redundant. One of said two redundant nodes is removed from the knowledge graph.

18 Claims, 13 Drawing Sheets

(56) References Cited

U.S. PATENT DOCUMENTS

| | | | |
|---|---|---|---|
| 2011/0137919 A1 | 6/2011 | Ryu et al. | |
| 2011/0276866 A1* | 11/2011 | Harrington | G06F 16/954 |
| | | | 715/209 |
| 2012/0158687 A1* | 6/2012 | Fang | G06F 16/338 |
| | | | 707/706 |
| 2015/0205707 A1* | 7/2015 | Dwarakanath | G06F 11/3608 |
| | | | 717/124 |
| 2017/0132329 A1 | 5/2017 | Yakout et al. | |
| 2019/0235961 A1* | 8/2019 | Giovannini | G06F 16/951 |
| 2019/0278935 A1* | 9/2019 | Bhuiyan | G06F 21/6218 |

OTHER PUBLICATIONS

Eccenca, "Semantic Solutions Manufacturing", https://www.eccenca.com/en/semanticsolutions-manufacturing.html, 2017 eccenca GmbH, pp. 1-9.

* cited by examiner

300

600

| node ID | IDs of direct neighbors | ID of 2nd-ary neighbors |
|---|---|---|
| X | ACFJKL | YZ |
| Y | CDFGJK | XZ |
| Z | ABFJKL | XY |

IDENTIFYING REDUNDANT NODES IN A KNOWLEDGE GRAPH DATA STRUCTURE

FIELD OF THE INVENTION

The invention relates generally optimization of knowledge graphs, and more specifically, to elimination of a redundant node from a knowledge graph.

BACKGROUND

The management of large amounts of data, especially unstructured data, continues to be a struggle for enterprises. It continues to be difficult to store and manage expert skilled knowledge in a way allowing a quick and reliable access. Lately, cognitive computing knowledge graphs are used to store and process information. A knowledge graph consists of facts—which may be collected from various sources inside and outside the enterprises—which may be stored on the nodes of a mesh of the knowledge graph. The nodes are typically connected via edges—also known as links—representing the relationship between individual nodes.

A crucial factor for the usability of the knowledge graph is the available number of nodes. Large knowledge graphs, like those used by an online encyclopedia or search engines may contain more than 100 million nodes. Apart from the sheer amount of fast disk storage needed, the search performance can deteriorate if too many nodes have to be processed. Actually, there may be too many—potentially redundant—nodes in such a knowledge graph. Experience shows that, over time, redundant nodes—or better nodes with redundant content—are integrated in the knowledge graphs. Redundant nodes may contain the same or, nearly the same information.

For example: in an open encyclopedia several authors may create entries covering (nearly) the same topic, but using a (slightly) different name for the entry. The potential redundancy is not obvious. Or, a search engine crawling the Internet naturally picks up a lot of redundant information, leading to redundant entries in the knowledge graph used by the search engine.

Thus, the size of the knowledge graph may be larger, measured in number of nodes than required to fulfil its purpose. Currently, finding these redundancies is a major manual undertaking or requires a vast amount of compute power in order to make semantic comparisons between individual nodes of the knowledge graph.

SUMMARY

According to various aspects of the present invention, a method, computer system, and computer program product are provided for eliminating a redundant node from a knowledge graph. A structural analysis may be performed of a knowledge graph by determining two nodes that have a similar structure, the similar structure of the two nodes indicated by similarity of a linkage pattern, a graph centrality, and/or a graph isomorphism. An empirical analysis may be performed by determining a search result correlation of potentially redundant nodes, the search result correlation comprising a correlation of search result nodes generated from different search queries to the knowledge graph or a correlation of search results due to selected search result nodes in subtrees of the potentially redundant nodes. The results of the structural analysis and the empirical analysis are combined to generate a redundancy confidence level for the two nodes. One of the two nodes is determined as redundant if the redundancy confidence level value exceeds a confidence level threshold. The node determined to be redundant is removed from the knowledge graph.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims such as computer systems and/or computer program products. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Figure 1:
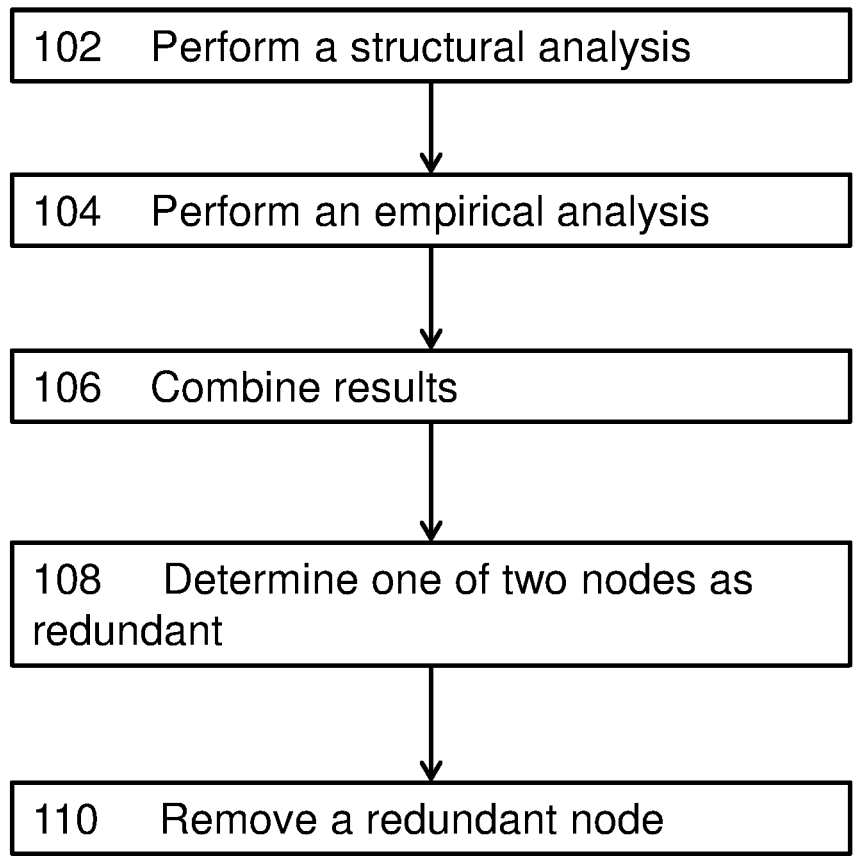

Preferred embodiments of the invention will be described, by way of example only, and with reference to the following drawings:

FIG. 1 shows a block diagram of an embodiment of the invention for eliminating a redundant node from a knowledge graph.

Figure 2:
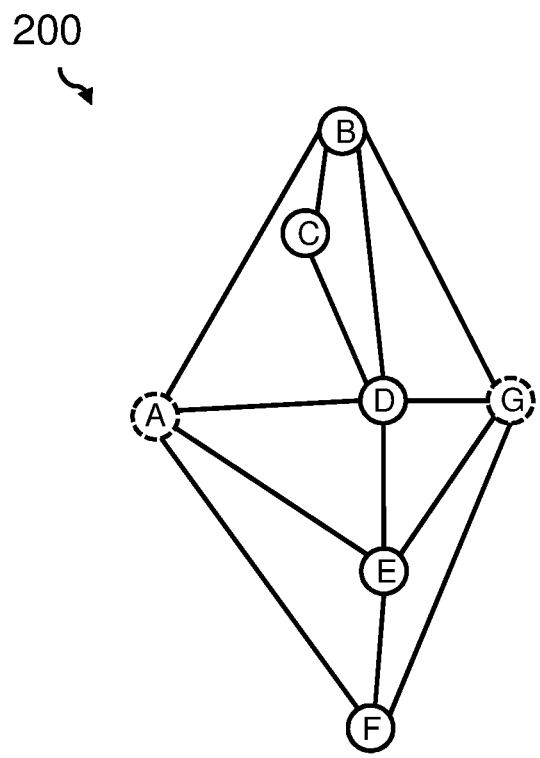

FIG. 2 shows a block diagram of an embodiment illustrating how to identify nodes with a similar direct linkage.

Figure 3:
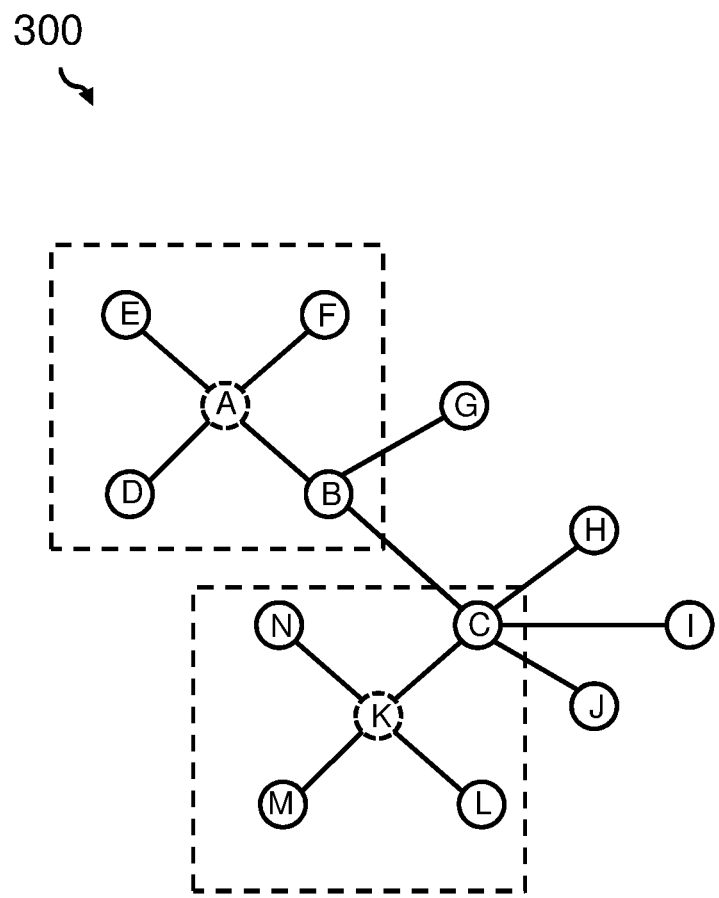

FIG. 3 shows a block diagram of an embodiment illustrating how to identify nodes by graph isomorphism with the same centrality.

Figure 4:
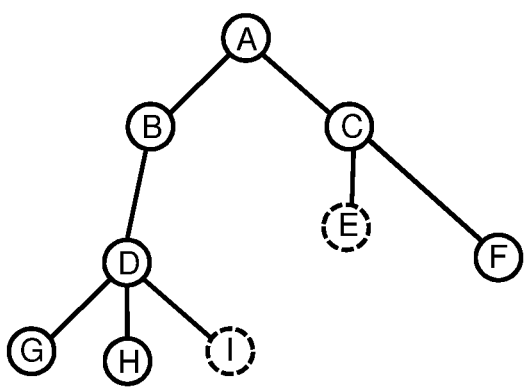

FIG. 4 shows a block diagram of an embodiment illustrating how to identify redundant nodes resulting frequently as hits from similar searches and user actions.

Figure 5:
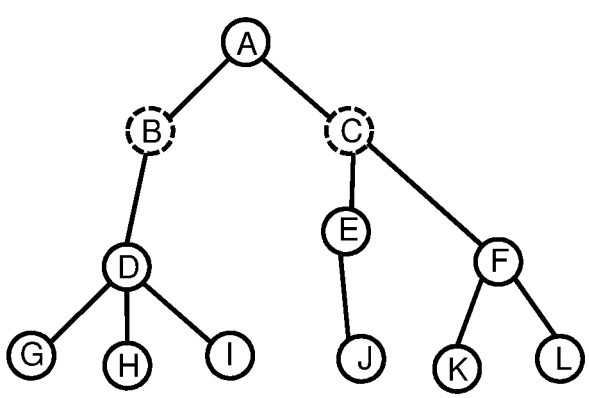

FIG. 5 shows a block diagram of an embodiment illustrating how to identify redundant nodes and sub-trees by running through different paths of the knowledge graph resulting in the same outcome with identical input values.

Figure 6:
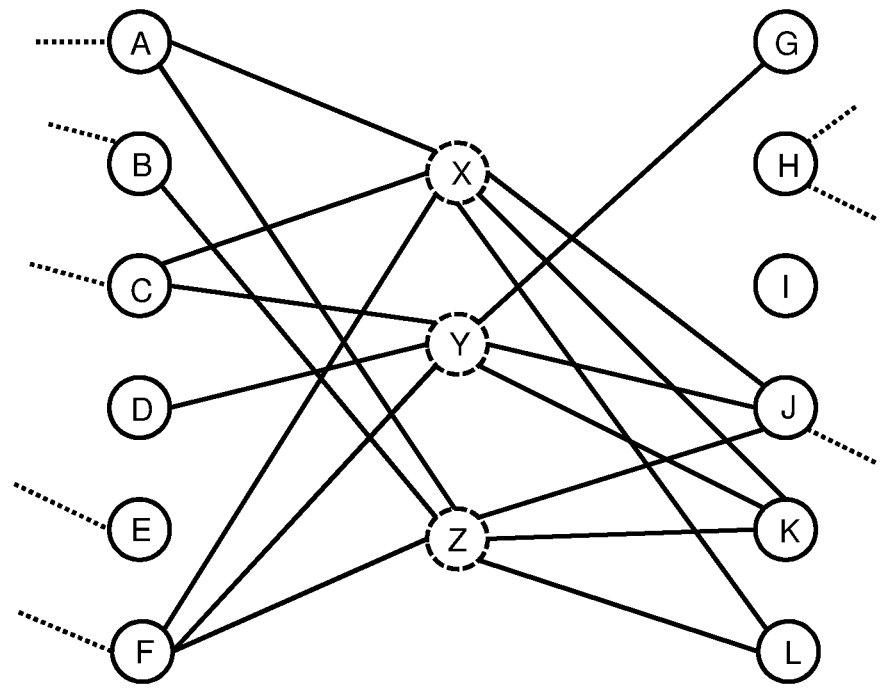

FIG. 6 shows a block diagram of an embodiment of a portion of a base knowledge graph used to illustrate the potential redundancy of the nodes X, Y, Z together with a table of neighboring nodes.

Figure 7:
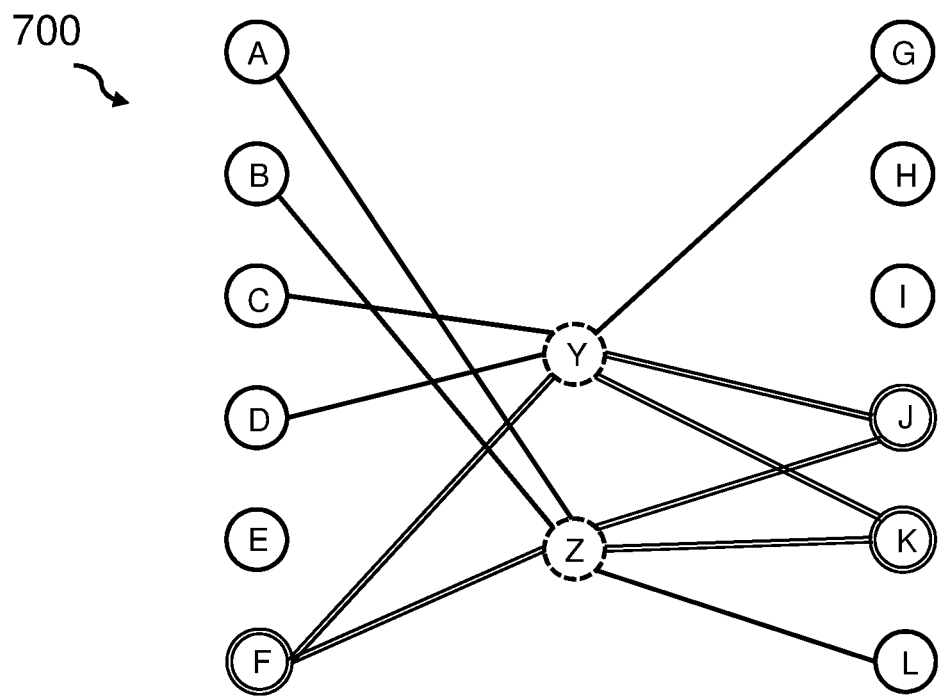

FIG. 7 shows a block diagram of the embodiment according to FIG. 3 showing three links connecting to the same nodes.

Figure 8:
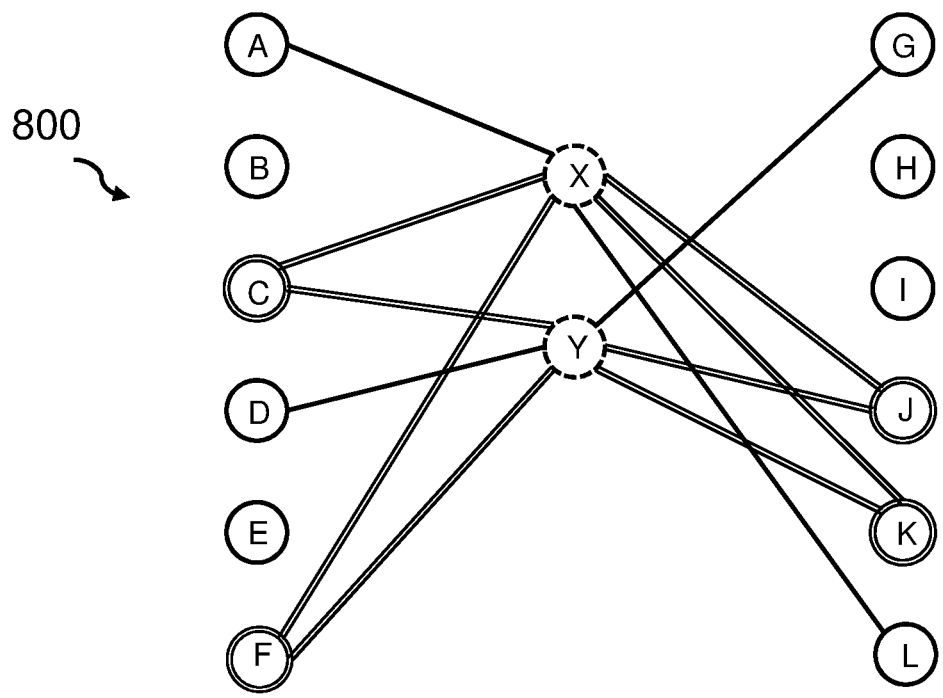

FIG. 8 shows a block diagram of the embodiment according to FIG. 3 showing four links connecting to the same nodes.

Figure 9:
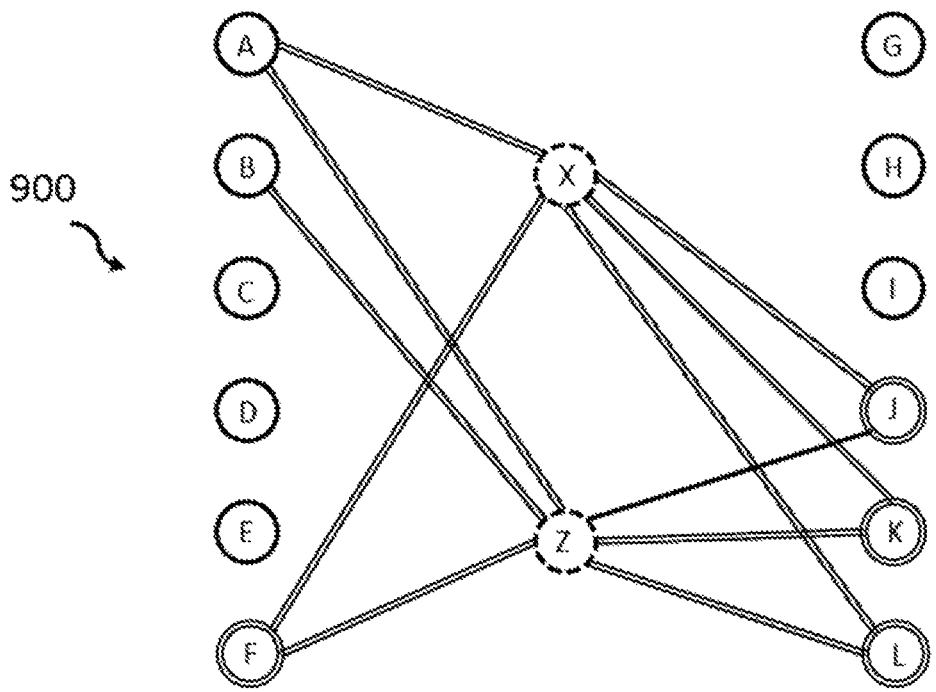

FIG. 9 shows a block diagram of the embodiment according to FIG. 3 showing five links connecting to the same nodes together with a table of links and a logical operation table.

Figure 10:
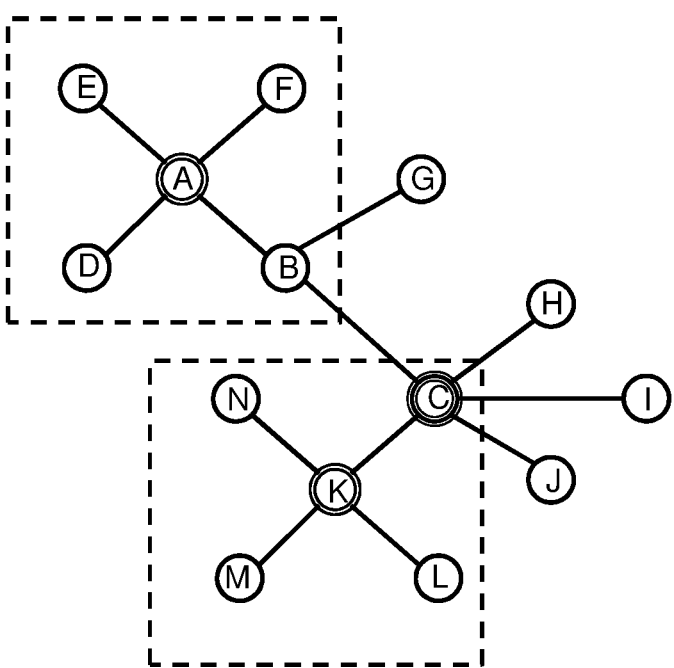

FIG. 10 shows a block diagram of an embodiment of a part of a knowledge graph illustrating a degree of centrality in the knowledge graph.

Figure 11:
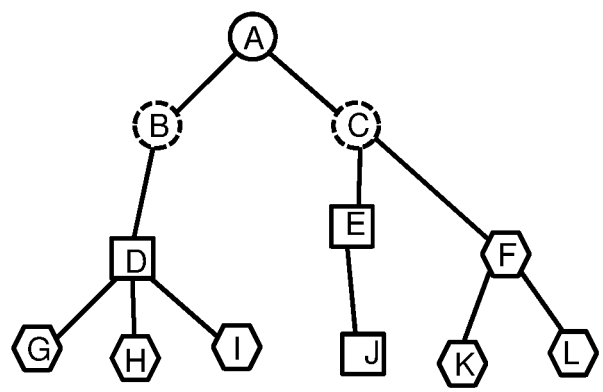

FIG. 11 shows a block diagram of the embodiment according to FIG. 5 showing two potential redundant nodes identified by the number of hits in subtrees dependent on the potentially redundant nodes.

Figure 12:
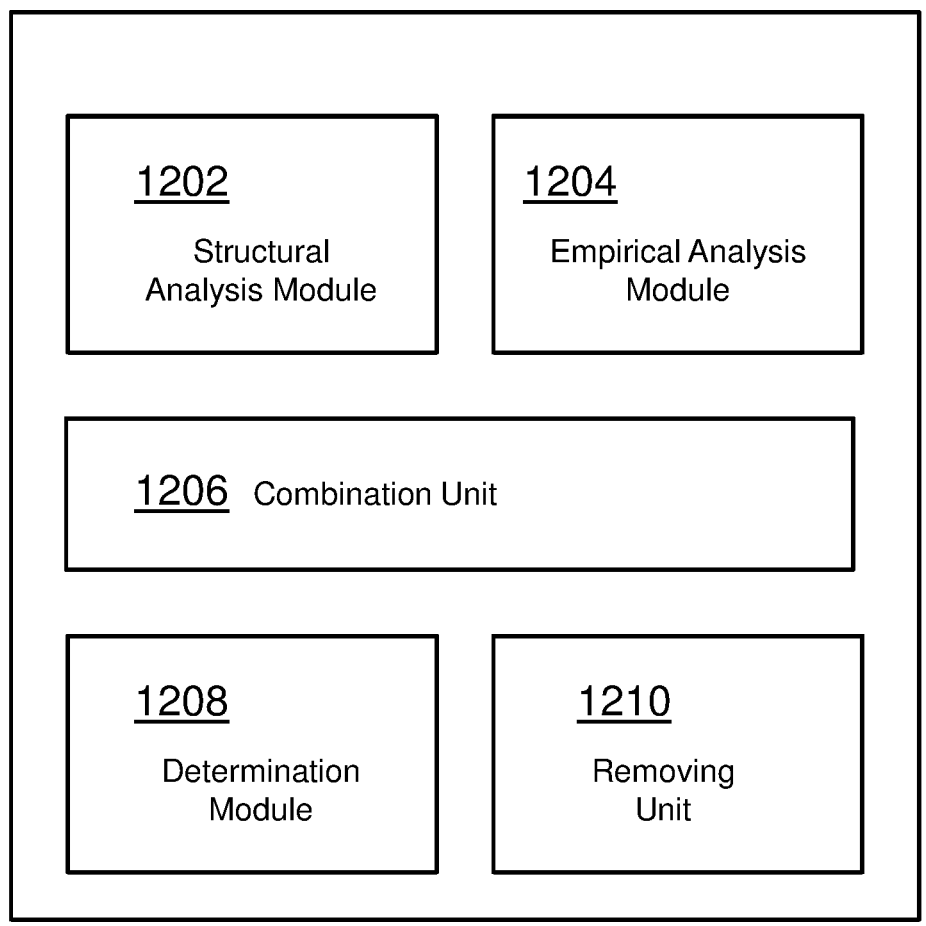

FIG. 12 shows a block diagram of an embodiment for eliminating a redundant node from a knowledge graph.

Figure 13:
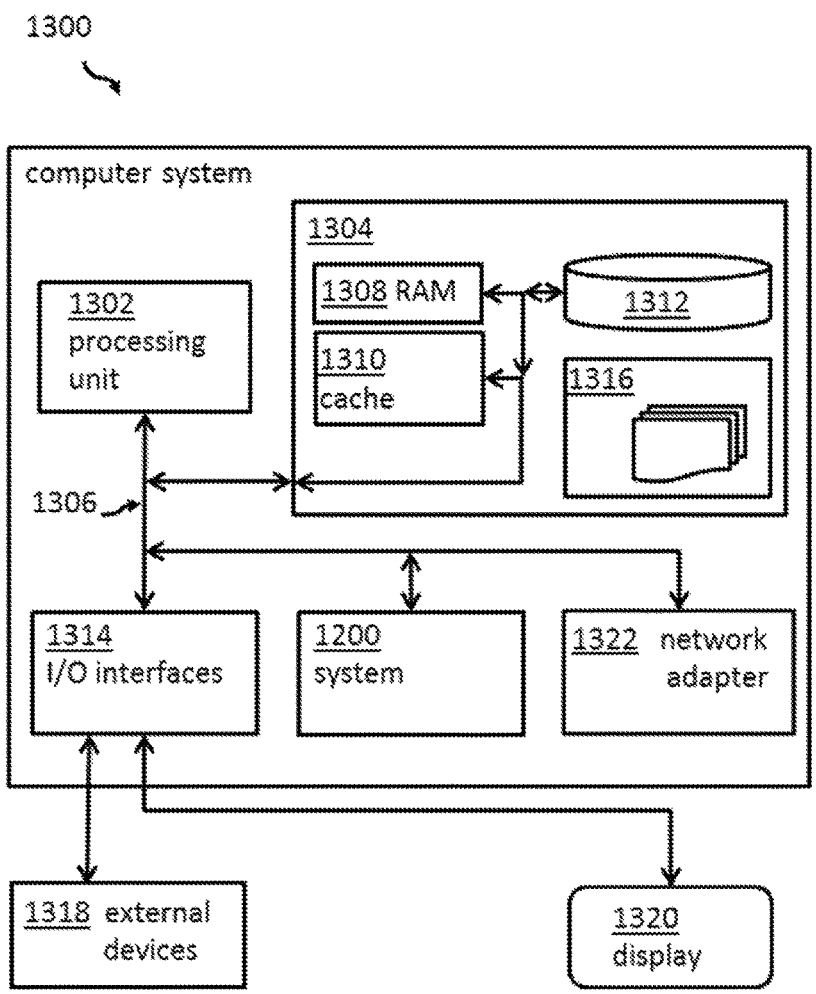

FIG. 13 shows a block diagram of the embodiment according to FIG. 12.

DETAILED DESCRIPTION

In the context of this description, the following conventions, terms and/or expressions may be used:

The term 'knowledge graph' may denote a networked data structure comprising facts—represented in nodes—and edges —representing connections or links between the nodes. Thus, the knowledge graph may represent a knowledge base for an organization of so-called unstructured data, i.e., facts, and their semantic relationships. Knowledge graphs are often used by search engines.

The term 'redundant node' may denote a node in the knowledge graph which content may also be covered by another node. Thereby, it may be assumed that the nodes of the knowledge graph comprise/store the facts of the knowledge graph.

The term 'structural analysis' may denote —in contrast to an empirical analysis —a determination of structural elements of the knowledge graph in a specific area. The specific area may be centered around a node and it may reach to a limited depth, wherein the depth may denote the layer of surrounding nodes. E.g., a depth value of 1 may describe the direct neighborhood of a node—i.e., nodes only reachable by one edge. A depth value of 2 may mean that one node may be in-between the node in question and another node— i.e., two edges may be required.

The term 'similar structure' may denote a comparable structure in terms of nodes, images and their respective relationships, but not an identical structure. Elements of the structure to be similar with another structure may be determined by way of mathematical principles, and a similarity value may be derived. A similarity between two structures may be given if the difference of their similarity values may be below a predefined —or dynamically defined —threshold value.

The term 'linkage pattern' may denote a recognizable characteristic pattern between nodes, pages and other nodes. The linkage pattern may be investigated on multiple depth levels. The linkage pattern may be more similar with lower depth values. If compared to higher depth values, e.g., nodes may be identified as redundant if a direct linkage (path length=1) is identical, i.e., they are regarded as redundant when they are linked to similar/identical set of nodes.

The term 'graph centrality' may denote —in graph theory and/or network analysis —that an indicator may identify the most important vertices or comparable nodes within a graph. Different centrality values determination processes may be applied (e.g., by walk structure, by network flows).

The term 'graph isomorphism' may denote a situation in a graph in which one node with its surrounding—i.e., edges and nodes of a certain depth —may be mapped to another node and the related surrounding of the other node, such that all elements may be mapped to each other. Such a mapping may be symmetrical.

The term 'empirical analysis' may denote a determination of historic access pattern to the knowledge graph, e.g., by a user or a search engine. Thus, storage of previous search results together with the inquiry, as well as, other parameters and metadata—e.g., starting points and other presented results (i.e., nodes)—may be required.

The term 'indirectly'—in particular 'indirect node' may denote a node not reachable by only one link or edge starting from a source node. However, the other node may be reachable by 2 or more edges via 1 or mode intermediate nodes.

The proposed invention eliminates a redundant node from a knowledge graph may offer multiple advantages and technical effects:

If redundant nodes can be identified, the total amount of storage required for the knowledge graph can be reduced significantly. However, not only the amount of required storage, but also the complexity of the knowledge graph may be reduced because also edges in the knowledge graph of nodes are no longer required —because they are redundant —and may be eliminated. Also this helps to reduce the required amount of storage.

The proposed method —as well as the related apparatus —does not need any semantic comparison of the content of the nodes. This may reduce significantly the amount of compute power required to identify redundant nodes. The invention makes use of the existing structure of the knowledge graph and may not need to rely on the content of individual nodes. Actually, only the structure of the knowledge graph is used in order to determine redundant nodes. This content agnostic method requires only efforts in the order of n, wherein n represents the number of nodes.

Also, the general principle of an identification of redundant nodes by a two-stage process helps to reduce the required compute power. Firstly, an area of potential redundancy in the knowledge graph may be localized and a second step may confirm the redundancy based on the structure of the knowledge graph portions. Finally, also a semantic comparison may be added in order to confirm the potential redundancies determined by the proposed main method.

The proposed invention relies on a plurality of steps, and the way the results of the steps are combined. This way, a first approach to redundant nodes may be confirmed by a secondary structural analysis of the knowledge graph. It may be noted that none of these steps rely on the content of any node. Only the structure of the knowledge graph—i.e., the relationship of nodes established by the edges —may be used for the structure-based determination of redundancies in the knowledge graph.

In the following, additional embodiments of the method —which are also applicable for the related apparatus —will be explained.

According to one advantageous embodiment of the method, linkage pattern may be determined by generating a sorted list of node identifiers —in particular all node identifiers —their direct neighbors —in particular those with a path length of 1 and their secondary neighbors, i.e., those with the path length of 2 or higher, and determining two further nodes as similar if the two nodes are both linked to a third node or if the two nodes are not linked to a third node.

Moreover, the invention may comprise determining a linkage similarity score value between the two nodes by applying logical operation to all linkages of the two nodes, and determining a structural redundancy value S of the two nodes (potentially redundant) if the linkage similarity score value is above a structural redundancy confidence threshold level. The threshold level may be predefined or alternatively, also dynamically adjustable. This way, a flexible algorithm may be used to set the threshold level also depending on the other steps used, as discussed below.

According to a further advantageous embodiment of the invention, the centrality value C of a node may be determined by determining an edge number linked directly or indirectly to the node up to a depth value. An initial depth value may be set to the value of one, i.e., only the number of direct neighbors may be considered. It may also be noted that the just described steps reflects the degree centrality. However, also other centrality methods may be used like, the harmonic centrality, the closeness centrality, etc. The different centrality methods may be used in combination or alternatively to the degree centrality. In case they are used in combination, a weighted average general centrality value may be determined combining the individual centrality results.

According to one preferred embodiment, the invention may also comprise starting with the depth value of 1, and upon more than two nodes having the same centrality value, increase the depth value by 1; and upon equality of the depth value with a predefined maximum depth value, stopping the determination of the centrality. Using this algorithm, the depth of the determined centrality may be increased, taking into account the actual structure of the knowledge graph.

According to one additionally preferred embodiment, the invention may also comprise, upon determining that two nodes having a centrality value above a predefined centrality threshold —in particular, e.g., 90% (of course, other percentage values are possible)—wherein the predetermined depth is the same for the two nodes, determining an isomorphism rank R of areas around the two nodes by $$R = (1/|\text{iso}M_{N2} - \text{iso}M_{N1} + \epsilon|)/\max(1/|\text{iso}M_{M2} - \text{iso}M_{M1} + \epsilon|).$$

Thereby, the variables have the following meaning:
$\text{iso}M_{NX}$=isomorphism of region X around a node NX, and
$\text{iso}M_{NX}$=isomorphism of regions around other node combinations being determined by the centrality determination in the whole knowledge graph, and
$\epsilon$=small numeric value, e.g., $10^{-3}$. This number may be required in order to avoid an accidental division by zero.

According to one additional embodiment of the invention, the correlation of search result nodes generated from different search queries to the knowledge graph may be performed by determining selection frequencies to two nodes, and determining a first empirical redundancy value $ESV_1$ if a difference between the selection frequencies is below a selection difference value. An additional normalization may be required allowing a more straightforward comparison of results.

According to a permissive embodiment of the invention, the correlation of search results due to selected search result nodes —in particular by a user —in sub-trees of the potentially redundant nodes may be performed by determining search result sum frequencies regarding nodes in the sub-trees, and determining a second empirical redundancy value $ESV_2$ if a difference between the search result sum frequencies is below a search result difference value. This way —comparing the last two presented embodiments —a differentiation between an individual node (e.g., a node at an end of a tree in the knowledge graph) and a node from which a complete sub-tree is dependent may be achieved.

According to a practical embodiment of the method, a combined redundancy confidence level RC value may be determined by $$RC = a*S + b*f(C,R) + c*ESV_2 + d*ESV_2.$$

Thereby, the variables have the following meaning:
S=structural redundancy value;
C=centrality value;
R=isomorphism rank; the values S, C, R have been defined above;
f is a function combination of C and R, e.g., f (C, R)=R* (1+e*C), wherein a is a constant;

$ESV_1$=first empirical redundancy value, and
$ESV_2$=second empirical redundancy value; also these values have been introduced above.
Finally, the values a, b, c, d are each a rational number with the further condition and a, c>b, d, i.e., a>b or d and c>b or d. It may be obvious that if e=0, the influence of C is eliminated.

This may reflect that the structural redundancy value (step 1) and step 2 may be primary decision criteria for a redundancy, wherein the determination of the isomorphism, as well as, step 4 may be used for a confirmation of the determinations.

A skilled person would understand that based on these thoughts also hierarchical approaches for the different steps may be applied.

According to another embodiment of the invention, the removing—i.e., deletion —of one of the two nodes may be performed if the combined redundancy confidence level RC value exceeds a predefined redundancy threshold value. This step may close the loop: A redundant node has been identified and may finally be removed. Related edges may also be removed.

Furthermore, the removal may be performed immediately—i.e., in the moment a redundant node may have been identified —or at a later stage in a reorganization mode of the knowledge graph. In this case, it may be useful to mark the redundant nodes as redundant either locally—i.e., as part of the node (metadata) information —or centralized in a data structure adapted for maintenance tasks for the knowledge graph.

In the following, a detailed description of the figures will be given. All instructions in the figures are schematic. Firstly, a block diagram of an embodiment of the invention for eliminating a redundant node from a knowledge graph is given. Afterwards, further embodiments, for eliminating a redundant node from a knowledge graph, will be described.

In the following, the invention will be described with explicit reference to the figures.

FIG. 1 shows a block diagram 100 of an embodiment of the invention for eliminating a redundant node from a knowledge graph. It may be noted that the embodiment of the invention works equally well for a plurality of nodes which may be processed in parallel or sequentially. Thus, a search and potential elimination of redundant nodes may be performed in parallel in different areas of the knowledge graph reducing the potential downtime and unavailability of the knowledge graph for the user.

Block diagram 100 describes performing, 102, a structural analysis —in particular the first step and a second step by determining two nodes with a similar structure. The similar structure of the two nodes indicated by a linkage pattern —in particular, starting with a path length 1 and describing/ counting how many edges are connecting neighboring nodes, also denoted as step 1 —and a graph centrality, and a graph isomorphism —denoted as step 2.

Block diagram 100 further comprises performing, 104, an empirical analysis —in particular step 3 and step 4 —by determining a search result correlation of potentially redundant nodes, the search result correlation comprising one of a correlation of search result nodes generated different search queries to the knowledge graph and, a correlation of search results due to selected search result nodes in particular by a user or a related process —in sub-trees of the potentially redundant nodes.

Last but not least, the block diagram 100 comprises combining, 106, results of the structural analysis and the empirical analysis to a redundancy confidence level value for the two nodes, and determining, 108 one of the two nodes as redundant (it does not matter which) if the redundancy confidence level value exceeds a predefined or dynamically adjustable confidence level threshold. Then, block diagram 100 comprises removing, 110, one of the two redundant nodes.

In the following, a more detailed description of the several steps for identifying redundant nodes will be described. It may also be noted that the list of used steps is exemplary. The steps can be applied on the same knowledge graph independently. The results can be combined by logical operators (e.g., AND, OR), or by weighing the results, e.g., only when the weight result of several steps creates a threshold, the node may be considered as redundant.

FIG. 2 shows a block diagram of an embodiment 200 illustrating how to identify nodes with a similar direct linkage (path length 1). Thereby, nodes are regarded as redundant if they are linked to a similar or identical set of nodes. This represents step 1. In this example, the —encircled nodes A and G would be recognized as redundant because they have edges to an identical set of other nodes (depth value 1) B, D, E and F.

FIG. 3 shows a block diagram of an embodiment 300 illustrating how to identify nodes by graph isomorphism with the same centrality. Four nodes with the same level of centrality—i.e., the surrounding link/edge structure —are compared. This represents —in combination —step 2. In this example, nodes A, K would be seen as redundant because they have the same centrality (edges two nodes B, D, E, F vs. Angeles two nodes C, M, N, L). According to step 2, an additional isomorphism comparison would be required to confirm or revoke the redundancy of the nodes A and K.

FIG. 4 shows a block diagram of an embodiment 400 illustrating how to identify redundant nodes resulting frequently as hits from similar searches and user actions. This represents step 3. Here, the dashed and circled nodes I and E would be seen as redundant because they are selected regularly by users for comparable inquiries against the knowledge graph.

FIG. 5 shows a block diagram of an embodiment 500 illustrating how to identify redundant nodes and sub-trees by running through different paths of the knowledge graph resulting in the same outcome with identical input values. Also, this will reduce the number of nodes in the knowledge graph, as sub-tree "B" is combined with a redundant sub-tree "C". This represents step 4. Alternatively, the complete sub-trees below B or C may be eliminated altogether.

FIG. 6 shows a block diagram of an embodiment 600 of a portion of a base knowledge graph used to illustrate the potential redundancy of the nodes X, Y, Z together with a table of neighboring nodes.

Firstly, it may be assumed that the nodes receive an identifier (ID), which is not necessarily unique as the usage of short IDs reduces the effort of compare operations. Non-unique IDs may result in classifying two or more nodes as redundant, which are actually not redundant. However, these false classifications are corrected in the subsequent redundancy check (typically, step 2, as described). The length of the ID (i.e., whether it is unique in a sub-graph or in the whole knowledge graph) is a pre-determined to meet the subject of optimizing the compute time. For example, in the knowledge graph containing $10^8$, only $10^4$ unique IDs may be used.

The invention uses generally a scouting process to crawl through the knowledge graph. Thereby, each node is processed once. A sorted list of node IDs of the direct neighbor (path length 1) and secondary neighbors (path length 2 or higher) is generated for each node. The linkage similarity is compared between the current node and its direct and secondary neighbors (or higher). A similarity exists when two further nodes are both linked to the third node or two further nodes are both not linked to the third node. The identified similarities are accumulated for each pair of nodes resulting in a similarity score. When the similarity score of two nodes exceeds a pre-determined or dynamically adjusted threshold and have more links in common compared to a pre-determined value (or dynamically adjusted), the nodes are considered as redundant.

It may be noted that the second condition "links in common" is required as otherwise two nodes would be considered redundant when they are only scarcely linked to the neighbors.

In the example of FIG. 6, the nodes, X, Y, and Z should be looked at more closely in the following excerpt knowledge graph (portion of the knowledge graph indicated by the dotted line on the left and right side of the knowledge graph portion 600). The links between the nodes A to L and the remaining knowledge graph are denoted as dotted lines. Only the links connected to the nodes X, Y, and Z are of interest here.

The table below the knowledge graph portion 600 shows the nodes in question (X, Y, and Z) and the IDs of direct and secondary neighbors. As an example, node X has the direct neighbors ACFJKL and the IDs of the secondary neighbors are YZ. A skilled person will be able to interpret the rest of the table of FIG. 6. In this example, it should be allowed to work with a very short ID for the nodes in the form of one single capital letter (in implementations, the node ID would comprise a plurality of characters). The knowledge graph of FIG. 6 is used in the subsequent description as a basis for explaining one or more of the steps.

FIG. 7 shows a block diagram of the embodiment 700 according to FIG. 3 showing three links connecting to the same nodes. The three links (or edges) of the potentially redundant nodes Y and Z are shown as double line, so are the first order nodes F, J, K.

FIG. 8 shows a block diagram of the embodiment 800 according to FIG. 3 showing four links connecting to the same nodes. Here, the same graphical logic as in FIG. 7 is used. The two potentially redundant nodes X and Y connect to the nodes C, F, J, K.

FIG. 9 shows a block diagram of the embodiment 900 according to FIG. 3 with five links connecting to the same nodes together with a table 902 of links and a logical operation table 904. Also here, the same high-lightning rules apply. Now, shown links from the potentially redundant nodes X, Z to the nodes A, B, C, F, J, K, L are shown as double lines. It may be noted that only the first order nodes of the potentially redundant nodes are reflected in the FIGS. 7, 8, 9. This is shown in the table 902 wherein a "1" represents a link/edge, and if two nodes are not connected, the table comprises a "0".

In a next step, the level of similarity of the linkage between the two nodes is determined by the sum of the logical operations XNOR—which is the logical complement of XOR—of each node. Thus, to each potential combination of redundant nodes (X/Y, X/Z, Y/Z), the XNOR operator is applied resulting in table 904. In each row, the sum of "1"s is determined and shown as the sum on the right side of the table. The higher the result, the higher is the level of similarity of the linkage. Now, a clip level (threshold) of, e.g., 10 for the link similarity is set and as a second condition that two nodes have at least four links in common is assumed. As a consequence, the nodes X and Z would be considered as redundant. As a measure for the confidence level, the linkage similarity score may be used.

Again, it may be noted, that the effort for this determination is in the order of n, as only one sweep through the knowledge graph is performed.

FIG. 10 shows a block diagram of an embodiment 1000 of a part of a knowledge graph illustrating a degree of centrality in the knowledge graph. The graph centrality is combined in a next step with the graph isomorphism later on.

Firstly, the process underlying the invention scans the graph centered in multiple positions (maximum m). One parameter of these metrics is the depth of the search. In general, the lower the depth, the smaller is the computational of time needed for this determination. The initial depth is derived from a pre-determined parameter. The algorithm automatically increases the depth of least 1 additional patch, but only for the nodes where a similar metric is found to be larger than a related threshold value.

FIG. 10 shows centers in the knowledge graph with different centrality. Nodes with a centrality of 1, 2 or 3 are encircled with a single line. Nodes with a centrality degree of 4 are encircled with a double-line, here, nodes A, K. Finally, node C has obviously, the centrality of 5 because 5 edges are related to node C. This node is therefore encircled with a triple-line.

If nodes with a comparable centrality degree have been identified, then, additionally, an isomorphism comparison is used to confirm the structural similarities/potential redundancy of the two nodes.

A threshold value may be used to enter the second step of the centrality/isomorphism approach: e.g., if two nodes have been determined to a similar graph centrality, e.g., >90% —then, and only then, graph as muffins and between these regions is determined which gives more inside, but which is at the same time more competition intensive. At the end of this determination, an isomorphism rank R may be calculated as:

$$R=(1/|isoM_{N2}-isoM_{N1}+\varepsilon|)/\max(1/|isoM_{M2}-isoM_{M1}+\varepsilon|), \text{ wherein}$$

$isoM_{NX}$=isomorphism of region X around a node NX, and $isoM_{MX}$=isomorphism of regions around other node combinations being determined by the centrality determination, and $\varepsilon$=small numeric value, e.g., $10^{-3}$. It may be noted that the two nodes N1 and N2 may represent the two potentially redundant nodes. The small $\varepsilon$ value is required in order to avoid a division by Zero. It may also be understood that the maximum and the equation is an absolute value, because differences between nodes all over the knowledge graph are reflected. In the case an equal isomorphism rank R exists, the dominator would take the value $\varepsilon$, and the rank R of executive power of nodes that are isomorph would equal 1. The rank, or confidence level, is defined as above, in order to maximize those couple of nodes which have the closest isomorphism. The division by the maximum (the maximum is going to be 1 only in a special case; could also be lower) was added in order to have a relative measure normalized to 1.

The usage of the isomorphism has been experienced to be of value, in particular, when multiple edge layers are considered. At this point, the algorithm continues to the depth of 2 for the nodes A and K, however, the result is not equal anymore, as node B is connected with 3 nodes. On the other hand, node C is connected to 5 other nodes. At this point, the algorithm would give the user node A and K as redundant node candidates of depth 1 (which was defined at the beginning of the process as a minimum).

A confidence level is given by the rank defined above in order sort the candidates in an ascending order from the couple of nodes, where the isomorphism was the closest.

It may also be noted that the effort is also here in the order of n, as one sweep through the knowledge graph is performed only.

FIG. 11 shows a block diagram of the embodiment 1100 according to FIG. 5 showing to potential redundant nodes identified by the number of hits in subtrees dependent on the potentially redundant nodes.

Before coming to this step, another step should be described (compare also FIG. 4). This step relates to identifying potentially redundant nodes resulting frequently as hits from different searches and user actions. This step is based on historical results of queries and what users have chosen. The data are reviewed periodically and used as follows:

The hits of searches are analyzed. If the same nodes are found for different searches, then it means that those may be semantically close, and also close in the knowledge graph. In those cases, the use action is further analyzed; and if the user always (or most of the times, programmable using a threshold) decided to select the same node, and then the other node(s) would be regarded as redundant. This process is sensitive to the amount of user data available and requires a representative amount of information to be present, e.g., 100 searches for the same subject producing the same selected node.

For example, in the knowledge graph-based search engine, the user input gets recorded and the statistics of the users that searched for the term "heart attack" shows that 80% of the users selected the term "myocardial attack" between the results (eventually also due to the length of the article). In this case, the algorithm would choose the two nodes ("heart attack" and "myocardial attack") as possible candidates for a semantic similarity and thus potential redundancy. At the end of the analysis, the candidate nodes are ranked with a parameter which is defined as normalization of the occurrence of the two terms in the user actions.

A confidence level for this step would be given by the relative —relative in comparison to all hits and all user selections —amount of correlated hits and correlated user selections.

It may also be noted that the effort for this step is in the order of n. The required amount of search operations scales with the size of the knowledge graph. For example, in one implementation, one would require that data from 0.1*n such operations and user selection operations must be evaluated before a representative result from the step may be obtained.

Turning back to FIG. 11, the step for identifying redundant nodes and sub-trees by running through a different path through the knowledge graph resulting in the same outcome with identical input values. By this step, sections or sub-trees of a knowledge graph are regarded as redundant if (a) search requests frequently find results in both sections or in both sub-trees simultaneously, or (b) users respond with read access to retrieve information from both sections or both sub-trees after being presented with search results, or (c) generate read access is observed to both sections of both sub-trees.

FIG. 11 shows the two dashed nodes B and C are potentially redundant. Some of the nodes —in particular, D, E, J shown as squared symbols —represent a search hit rate for a first query, whereas the nodes shown as hexagons —in particular, G, H, I, K, F, L —represent searches for a second query.

The following example may be considered: in 92% of the cases when nodes, G, H, and I are denoted as hits by a query, also nodes F, K and L are denoted as hits. In 94% of the cases, if node D is denoted as a hit by a query, also nodes E and J are denoted as hits. The threshold is set to 90% in this example. The sub-tree of B and C are considered as redundant as the average simultaneous hit rate exceeds 90%.

A weighing of the various queries can be made by a frequency of the queries or by a number of nodes being hit by the query. The latter option has the advantage that nodes never hit simultaneously by a query (and may be not redundant) can be weighed with Zero.

This step does not require necessarily simultaneous read access to the parent nodes B and C. In this case, only the sub-trees without the parent nodes are regarded as redundant (in the example, nodes, D to L). In case a simultaneous read access has been observed for B and C, the two parent nodes including their sub-trees are regarded as redundant.

Similar to the step, as described above (same hit rates for nodes), the confidence level is given by the relative amount of correlated hits and/or correlated read access operations by users.

The effort for this step is also in the order of n. The required amount of search operations scales with the size of the knowledge graph. Thus, all the discussed step only scale linearly with the size of the knowledge graph.

One of the strength of the steps presented above lies in the variety —hence, when multiple different steps are used in combination. Identify the same node as redundant. The combined redundant confidence level is increased. As discussed above, the first step and the second step may be viewed as "structural" and the steps 3 and 4 may be seen as "empirical". Furthermore, one can see steps 1 and 3 as "critical"—these are the most essential tests of redundancy —and steps 2 and 4 as "conformational". These tests confirm (or refute) the findings of the steps 1 and 3, but are not sufficient in and of themselves.

Both steps, 1 and 3, must identify a node to be redone for it to be marked as redundant over-all. Confirmation of redundancy by steps 2 and 4 increases the confidence level. Refutation of redundancy by steps 2 and 4 reduces the confidence level. Required confidence levels for actions (e.g., node merging/elimination) can be set as desired for the specific knowledge graph or pruning process.

In preparation for pruning/merging/deletion, the same information that has helped to established redundancy can also be used to establish a "primary" node. In general, greater knowledge graph linkage and more frequent user search selections are evidence of primacy. So, in step 1 node X and Z would be considered equally primary (because they each have six immediate links), but under step 2 node K would be considered primary because its depth-2 linkage is higher than the one of node A (5 links vs. 3). For steps 3 and 4 primacy would be driven by the search results most often selected by users.

FIG. 12 shows a block diagram 1200 of an embodiment of the invention for eliminating a redundant node from a knowledge graph. The block diagram 1200 comprises a structural analysis module 1202 adapted for performing a structural analysis, by determining two nodes with a similar linkage structure, the structure indicated as similar by a linkage pattern, a graph centrality, and/or a graph isomorphism, and an empirical analysis module 1204 adapted for performing an empirical analysis by determining a search result correlation of potentially redundant nodes, the search result correlation comprising one of a correlation of search result nodes generated from different search queries to the knowledge graph and, a correlation of search results due to selected search result nodes in subtrees of the potentially redundant nodes.

The invention comprises further a combination unit 1206 adapted for combining results of the structural analysis and the empirical analysis to generate a redundancy confidence level value for the two nodes, a determination module 1208 adapted for determining one of the two nodes as redundant if the redundancy confidence level value exceeds a confidence level threshold, and a removing unit 1210 adapted for removing one of the two redundant nodes.

Embodiments of the invention may be implemented together with virtually any type of computer, regardless of the platform being suitable for storing and/or executing program code. FIG. 13 shows, as an example, a computing system 1300 suitable for executing program code related to the presently disclosed invention.

The computing system 1300 is only one example of a suitable computer system and is not intended to suggest any limitation as to the scope of use or functionality of embodiments of the invention described herein, regardless, whether the computer system 1300 is capable of being implemented and/or performing any of the functionality set forth hereinabove. In the computer system 1300, there are components, which are operational with numerous other general purpose or special purpose computing system environments or configurations. Examples of well-known computing systems, environments, and/or configurations that may be suitable for use with computer system/server 1300 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1300 may be described in the general context of computer system-executable instructions, such as program modules, being executed by a computer system 1300. Generally, program modules may include routines, programs, objects, components, logic, data structures, and so on that perform particular tasks or implement particular abstract data types. Computer system/server 1300 may be practiced in distributed cloud computing environments where tasks are performed by remote processing devices that are linked through a communications network. In a distributed cloud computing environment, program modules may be located in both, local and remote computer system storage media including memory storage devices.

As shown in the figure, computer system/server 1300 is shown in the form of a general-purpose computing device. The components of computer system/server 1300 may include, but are not limited to, one or more processors or processing units 1302, a system memory 1304, and a bus 1306 that couple various system components including system memory 1304 to the processor 1302. Bus 1306 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 1300 typically includes a variety of computer system readable media. Such media may be any available media that is accessible by computer system/server 1300, and it includes both, volatile and non-volatile media, removable and non-removable media.

The system memory 1304 may include computer system readable media in the form of volatile memory, such as random access memory (RAM) 1308 and/or cache memory 1310. Computer system/server 1300 may further include other removable/non-removable, volatile/non-volatile computer system storage media. By way of example only, a storage system 1312 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 1306 by one or more data media interfaces. As will be further depicted and described below, memory 1304 may include at least one program product having a set (e.g., at least one) of program modules that are configured to carry out the functions of embodiments of the invention.

The program/utility, having a set (at least one) of program modules 1316, may be stored in memory 1304 by way of example, and not limiting, as well as an operating system, one or more application programs, other program modules, and program data. Each of the operating systems, one or more application programs, other program modules, and program data or some combination thereof, may include an implementation of a networking environment. Program modules 1316 generally carry out the functions and/or methodologies of embodiments of the invention, as described herein.

The computer system/server 1300 may also communicate with one or more external devices 1318 such as a keyboard, a pointing device, a display 1320, etc.; one or more devices that enable a user to interact with computer system/server 1300; and/or any devices (e.g., network card, modem, etc.) that enable computer system/server 1300 to communicate with one or more other computing devices. Such communication can occur via Input/Output (I/O) interfaces 1314. Still yet, computer system/server 1300 may communicate with one or more networks such as a local area network (LAN), a general wide area network (WAN), and/or a public network (e.g., the Internet) via network adapter 1322. As depicted, network adapter 1322 may communicate with the other components of computer system/server 1300 via bus 1306. It should be understood that although not shown, other hardware and/or software components could be used in conjunction with computer system/server 1300. Examples, include, but are not limited to: microcode, device drivers, redundant processing units, external disk drive arrays, RAID systems, tape drives, and data archival storage systems, etc.

Additionally, the system 1200 for eliminating a redundant node from a knowledge graph may be attached to the bus system 1306.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for eliminating a redundant node from a knowledge graph, said method comprising:
performing a structural analysis of a knowledge graph by determining that two nodes have a similar structure, the similar structure of the two nodes indicated by similarity of one or more of the following structural elements: a linkage pattern, a graph centrality, or a graph isomorphism;
performing an empirical analysis, by determining a search result correlation of potentially redundant nodes having the similar structure independent of a context of the potentially redundant nodes, said search result correlation comprising a correlation of search result nodes generated from different search queries to said knowledge graph or a correlation of search results due to selected search result nodes in subtrees of said potentially redundant nodes;
combining results of said structural analysis and said empirical analysis to generate a redundancy confidence level value for said two nodes;
determining one of said two nodes as redundant if said redundancy confidence level value exceeds a confidence level threshold; and
removing the node determined to be redundant from the knowledge graph.

2. The method according to claim 1, wherein said linkage pattern is determined by
generating a sorted list of node identifiers, direct neighbors, and secondary neighbors;
determining two further nodes as similar if said two further nodes are both linked to a third node or if said two further nodes are not linked to a third node;
determining a linkage similarity score value between the two further nodes by applying logical operations to all linkages of said two further nodes; and
determining whether a structural redundancy value S of the two further nodes of said linkage similarity score value is above a structural redundancy confidence threshold level.

3. The method according to claim 1, wherein a centrality value C of a node is determined by determining an edge number linked directly or indirectly to said node up to a depth value.

4. The method according to claim 3, further comprising:
starting with said depth value of 1, and upon more than two nodes having said same centrality value;
increasing said depth value by 1; and
stopping said determination of said centrality upon equality of said depth value with a predefined maximum depth value.

5. The method according to claim 4, further comprising:
determining whether two nodes have a centrality value above a predefined centrality threshold, wherein said predetermined depth for the two nodes is the same;
determining an isomorphism rank R of areas around said two nodes by
$R=(1/|isoMN2-isoMN1+\epsilon|)/max(1/|isoMM2-isoMM1+\epsilon|)$, wherein
$isoM_{Nx}$ equals an isomorphism of region X around a node NX;
$isoM_{MX}$ equals an isomorphism of regions around other node combinations being determined by said centrality determination in said whole knowledge graph; and
$\epsilon$ equals a small numeric value.

6. The method according to claim 1, wherein said correlation of search result nodes generated from different search queries to said knowledge graph is performed by:
   determining selection frequencies to two nodes; and
   determining a first empirical redundancy value ESV1 if a difference between said selection frequencies is below a selection difference value.

7. The method according to claim 1, wherein said correlation of search results due to selected search result nodes in subtrees of said potentially redundant nodes is performed by:
   determining search result sum frequencies regarding nodes in said subtrees, and
   determining a second empirical redundancy value ESV2 if a difference between said search result sum frequencies is below a search result difference value.

8. The method according to claim 1, wherein a combined redundancy confidence level RC value is determined by $RC=a*S+b*f(C,R)+c*ESV_1+d*ESV_2$, wherein,
   S equals a structural redundancy value;
   C equals a centrality value;
   R equals an isomorphism rank;
   f is a function combining C and R;
   a is a constant;
   $ESV_1$ equals a first empirical redundancy value;
   $ESV_2$ equals a second empirical redundancy value; and
   a, b, c, d are each a rational number, wherein a, c is greater than b, d.

9. The method according to claim 7, wherein said removing one of said two nodes is performed if said combined redundancy confidence level RC value exceeds a predefined redundancy threshold value.

10. A computer system for eliminating a redundant node from a knowledge graph, the computer system comprising:
   one or more computer processors;
   one or more computer-readable storage media;
   program instructions stored on the computer processor for execution by at least one of the one or more processors, the program instructions comprising:
   program instructions to perform a structural analysis of a knowledge graph by determining that two nodes have a similar structure, the similar structure of the two nodes indicated similarity of one or more of the following structural elements: a linkage pattern, a graph centrality, or a graph isomorphism;
   program instructions to perform an empirical analysis by determining a search result correlation of potentially redundant nodes having the similar structure independent of a context of the potentially redundant nodes, said search result correlation comprising a correlation of search result nodes generated from different search queries to said knowledge graph or a correlation of search results due to search results due to selected search result nodes in subtrees of said potentially redundant nodes;
   program instructions to combine results of said structural analysis and said empirical analysis to generate a redundancy confidence level value for said two nodes;
   program instructions to determine one of said two nodes as redundant if said redundancy confidence level value exceeds a confidence level threshold; and
   program instructions to remove the node determined to be redundant from the knowledge graph.

11. The computer system according to claim 10, wherein the program instructions to perform the structural analysis are also adapted for determining said linkage pattern access and include:
   program instructions adapted to generate a sorted list of node identifiers, direct neighbors, and secondary neighbors;
   program instructions to determine two further nodes as similar if said two further nodes are both linked to a third node or if said two further nodes are not linked to a third node;
   program instructions to determine a linkage similarity score value between the two further nodes by applying logical operations to all linkages of said two further nodes; and
   program instructions to determine whether a structural redundancy value S of the two further nodes of said linkage similarity score value is above a structural redundancy confidence threshold level.

12. The computer system according to claim 10, wherein the program instructions to perform the structural analysis are also adapted to determine centrality value C of a node by determining an edge number linked directly or indirectly to said node up to a depth value.

13. The computer system according to claim 12, wherein the program instructions to perform the structural analysis further comprise instructions to:
   program instructions to start with said depth value of 1, and upon more than two nodes having said same centrality value;
   program instructions to increase said depth value by 1; and
   program instructions to stop said determination of said centrality upon equality of said depth value with a predefined maximum depth value.

14. The computer system according to claim 13, wherein the program instructions to perform an empirical analysis further comprise:
   program instructions to determine whether two nodes have a centrality value above a predefined centrality threshold, wherein said predetermined depth for the two nodes is the same;
   program instructions to determine an isomorphism rank R of areas around two said nodes by $R=(1/|isoMN2-isoMN1+\epsilon|)/max(1/|isoMM2-isoMM1+\epsilon|)$, wherein $isoM_{NX}$ equals an isomorphism of region X around a node NX;
   $isoM_{MX}$ equals an isomorphism of regions around other node combinations being determined by said centrality determination in said whole knowledge graph; and
   $\epsilon$ equals a small numeric value.

15. The computer system according to claim 10, wherein said correlation of search result nodes generated from different search queries to said knowledge graph is performed by determining selection frequencies to two nodes, and determining a first empirical redundancy value $ESV_1$ of a difference between said selection frequencies is below a selection difference value.

16. The computer system according to claim 10, wherein said correlation of search results due to selected search result nodes in subtrees of said potentially redundant nodes is performed by determining search result sum frequencies regarding nodes in said subtrees and determining a second empirical redundancy value $ESV_2$ if a difference between said search result sum frequencies is below a search result difference value.

17. The computer system according to claim 10, wherein a combined redundancy confidence level RC value is determined by
   $RC=a*S+b*f(C,R)+c*ESV_1+d*ESV_2$, wherein,
   S equals a structural redundancy value;

C equals a centrality value;

R equals an isomorphism rank;

f is a function combining C and R;

a is a constant;

$ESV_1$ equals a first empirical redundancy value;

$ESV_2$ equals a second empirical redundancy value; and a, b, c, d are each a rational number, wherein a, c is greater than b, d.

18. A computer program product using a computing device to eliminate a redundant node from a knowledge graph, the computer program product comprising:

one or more non-transitory computer-readable storage media and program instructions stored on the one or more non-transitory computer-readable storage media, the program instructions, when executed by the computing device, cause the computing device to perform a method comprising:

performing a structural analysis of a knowledge graph by determining that two nodes have a similar structure, the similar structure of the two nodes indicated by similarity of one or more of the following structural elements: linkage pattern, a graph centrality, or a graph isomorphism;

performing an empirical analysis, by determining a search result correlation of potentially redundant nodes having the similar structure independent of a context of the potentially redundant nodes, said search result correlation comprising a correlation of search result nodes generated from different search queries to said knowledge graph or a correlation of search results due to selected search result nodes in subtrees of said potentially redundant nodes;

combining results of said structural analysis and said empirical analysis to generate a redundancy confidence level value for said two nodes;

determining one of said two nodes as redundant if said redundancy confidence level value exceeds a confidence level threshold; and removing the node determined to be redundant from the knowledge graph.

* * * * *